United States Patent
Parekh et al.

(10) Patent No.: US 11,042,159 B2
(45) Date of Patent: Jun. 22, 2021

(54) SYSTEMS AND METHODS FOR PRIORITIZING DATA PROCESSING

(71) Applicant: Toyota Motor North America, Inc., Plano, TX (US)

(72) Inventors: Devang H. Parekh, Dallas, TX (US); Christopher Ogden, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 72 days.

(21) Appl. No.: 16/227,787

(22) Filed: Dec. 20, 2018

(65) Prior Publication Data
US 2020/0201325 A1    Jun. 25, 2020

(51) Int. Cl.
| | |
|---|---|
| G05D 1/00 | (2006.01) |
| G06F 9/48 | (2006.01) |
| G06F 9/50 | (2006.01) |
| G05D 1/02 | (2020.01) |

(52) U.S. Cl.
CPC ......... *G05D 1/0088* (2013.01); *G05D 1/0223* (2013.01); *G06F 9/4881* (2013.01); *G06F 9/50* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 8,751,712 B2 | 6/2014 | Preston | |
| 10,328,947 B1* | 6/2019 | Hansel | B60W 50/045 |
| 2012/0307062 A1 | 12/2012 | Naya et al. | |
| 2013/0083679 A1 | 4/2013 | Krishnaswamy et al. | |
| 2013/0222133 A1 | 8/2013 | Schultz et al. | |
| 2018/0022361 A1* | 1/2018 | Rao | B60W 30/143 701/23 |
| 2018/0136653 A1* | 5/2018 | Tao | B60W 50/02 |
| 2018/0232585 A1* | 8/2018 | Kim | G06N 3/0445 |

(Continued)

FOREIGN PATENT DOCUMENTS

| | | |
|---|---|---|
| WO | 2011099189 A1 | 8/2011 |
| WO | 2015124694 A2 | 8/2015 |

OTHER PUBLICATIONS

Performance Analysis for Priority-Based Broadcast in Vehicular Networks (http://journals.sagepub.com/doi/full/10.1155/2013/734637), Hindawi Publishing Corporation—International Journal of Distributed Sensor Networks—vol. 2013, Article ID 734637, 9 paegs (accessed Nov. 13, 2013).

*Primary Examiner* — Kaveh Abrishamkar
(74) *Attorney, Agent, or Firm* — Dinsmore & Shohl, LLP

(57) ABSTRACT

A vehicle data processing system includes a group of sensors and a controller. The group of sensors is arranged on board a vehicle and operable to detect and capture driving event. The controller is coupled to the group of sensors and operable to receive one or more data streams indicative of the driving event data from the group of sensors. The controller is further operable to (i) analyze the one or more data streams, (ii) determine a current operation status of a vehicle based on the one or more data streams, (iii) determine whether or not the current operation status of the vehicle triggers prioritized processing of the one or more data streams, and (iv) upon determination that the prioritized processing is triggered, apply the prioritized processing.

23 Claims, 7 Drawing Sheets

(56) References Cited

U.S. PATENT DOCUMENTS

| | | | |
|---|---|---|---|
| 2018/0251135 A1* | 9/2018 | Luo | G05D 1/0223 |
| 2018/0270542 A1* | 9/2018 | Ramalingam | G02B 27/0101 |
| 2019/0050718 A1* | 2/2019 | Tickoo | G01C 21/28 |
| 2019/0057623 A1* | 2/2019 | Magsood | G01R 33/58 |
| 2019/0079528 A1* | 3/2019 | Zhu | B60W 30/143 |
| 2019/0324450 A1* | 10/2019 | Lurie | G05D 1/0246 |

* cited by examiner

SYSTEMS AND METHODS FOR PRIORITIZING DATA PROCESSING

TECHNICAL FIELD

Embodiments described herein generally relate to systems and methods for prioritizing data processing for use with vehicles and more specifically, to systems and methods for prioritizing data processing based on a current operation status of a vehicle.

BACKGROUND

The volume of data generated and transmitted by vehicles is rising drastically. Some vehicles already produce a large volume of data that is processed and transmitted to a remote computer system, such as via a cloud network. Such data processing and transfer is already expensive. Such expenses are only expected to rise.

Vehicles may encounter driving events that require substantially real-time determinations. In order to make real-time determinations as to various driving events, a vehicle computing system may need to process a large amount of vehicle data quickly. If a large amount of vehicle data is processed substantially simultaneously, the processor may not return the results required by a current operation status of a vehicle. For example, an autonomous vehicle may need to identify moving pedestrians with a higher priority than detecting nearby buildings and the processor may process vehicle data with a different order. Moreover, the processor may be overloaded with simultaneous data processing and result in inefficiency and/or delay. Accordingly, there is a need to provide systems and methods for prioritizing processing of vehicle data based on a current operating status of a vehicle. Also, there is a need to provide systems and methods for determining a current operating status of a vehicle correlated with processing priority that may trigger or dictate prioritized processing.

SUMMARY

In one embodiment, a vehicle data processing system includes a group of sensors, a controller, and a communication interface. The group of sensors is arranged on board and operable to detect and capture driving event data. The controller is coupled to the group of sensors and operable to receive one or more data streams indicative of the driving event data from the group of sensor. The controller is further operable to (i) analyze the one or more data streams, (ii) determine a current operation status of a vehicle based on the one or more data streams, (iii) determine whether or not the current operation status of the vehicle triggers prioritized processing of the one or more data streams, and (iv) upon determination that the prioritized processing is triggered, apply the prioritized processing.

In another embodiment, a vehicle data processing system comprises multiple sensors, a processor and a memory. The multiple sensors collect one or more data points relating to a driving event of a vehicle. The processor is coupled to the multiple sensors and operable to receive the one or more data points. The processor is further operable to determine a current action of the vehicle based on the one or more data points. The memory is coupled to the processor and stores a status manager program and a sensor data queue for storing a set of sensor data prior to a present reference point. Upon execution by the processor, the status manager program causes the processor to prioritize and process present sensor data that is being collected by the multiple sensors at the present reference point and the set of sensor data that are queued in the sensor data queue based on the current action of the vehicle.

In another embodiment, a vehicle data processing method comprises the steps of (i) collecting with multiple sensors one or more data points relating to a driving event of a vehicle, (ii) storing a set of sensor data that has been collected prior to a present reference point in a sensor data queue, (iii) receiving at a processor one or more data points from the multiple sensors, (iv) determining a current action of the vehicle based on the one or more data points, and (v) prioritizing and processing, with the processor, present sensor data that is being collected by the multiple sensors at the present reference point and the set of sensor data that are queued in the sensor data queue based on the current action of the vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
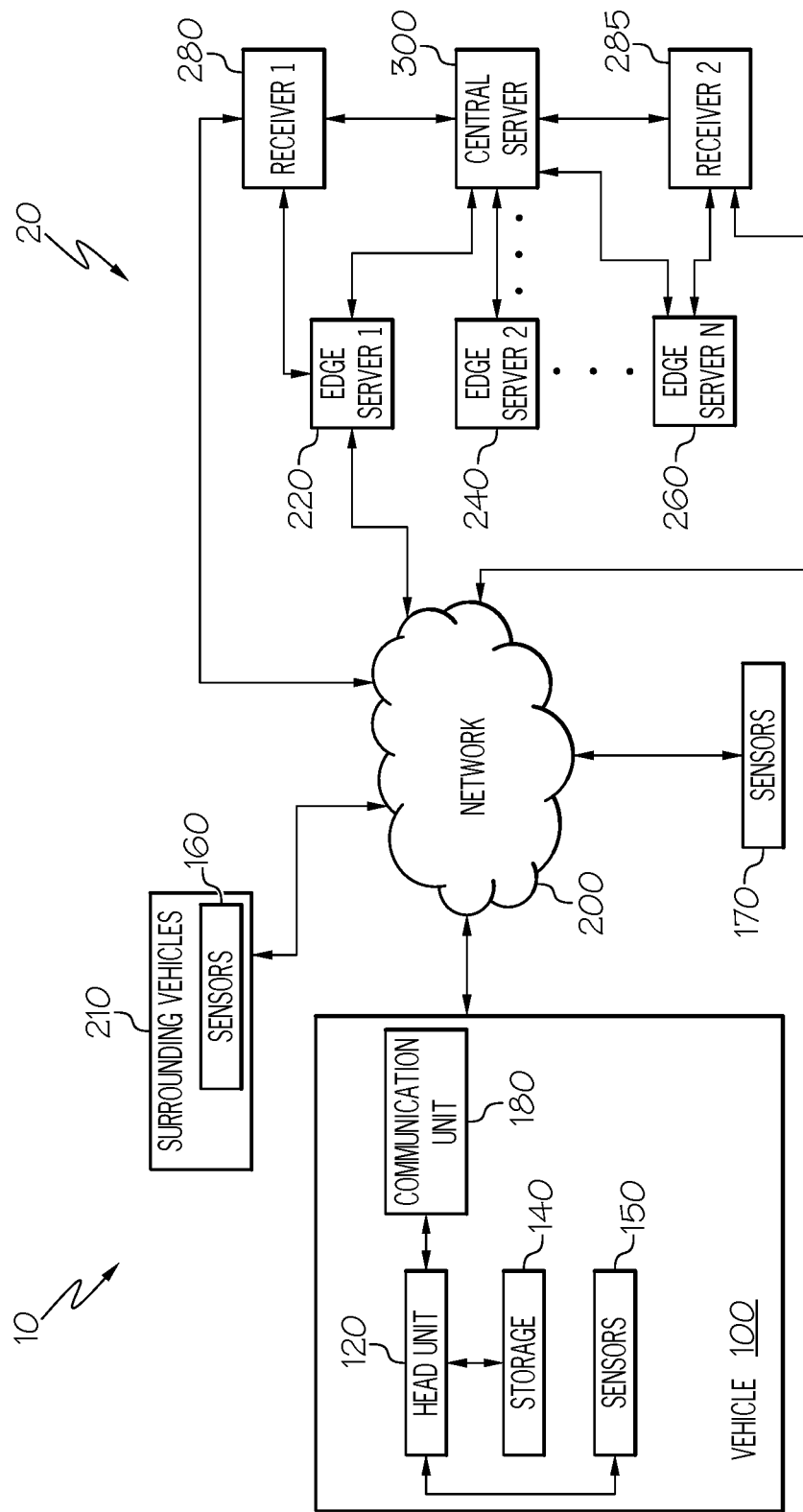
FIG. 1 schematically depicts a connected cars system according to one or more embodiments shown and described herein.

Connected cars may be equipped to communicate with other devices, utilizing connectivity available via wireless and/or cellular networks. Connected cars may be connected to and communicate with their surroundings. Connected cars may communicate via a variety of communication models, including Vehicle to Infrastructure ("V2I"), Vehicle to Vehicle ("V2V"), Vehicle to Cloud ("V2C"), and Vehicle to Everything ("V2X") communication models. A V2I communication model facilitates the communication between a vehicle and one or more infrastructure devices, which may enable the exchange of data generated by a vehicle and information about the infrastructure. A V2V communication model facilitates communication between vehicles and may allow for the exchange of data generated by surrounding vehicles, including speed and position information of surrounding vehicles. A V2C communication model facilitates the exchange of information between a vehicle and a cloud system. A V2X communication model interconnects all types of vehicles and infrastructure systems with one another.

As discussed above, connected cars operate to capture and generate a large amount of data about a vehicle, surrounding vehicles, the environment, etc. Connected cars may seamlessly transmit such data to surrounding vehicles, a cloud server, other infrastructure, etc. and communicate with them via the network. The embodiments disclosed herein include systems and methods for prioritizing processing of vehicle data based on a current operating condition of vehicles. The embodiments of the systems and methods for prioritizing processing of vehicle data described herein may provide advantages for use with connected cars. For example, embodiments may effectively process a large size of vehicle data based on predetermined priority, or predetermined hierarchical layers of priority. This may result in faster, more efficient processing of vehicle data and may enable a vehicle to make determinations in response to driving events.

In the embodiments disclosed herein, prioritized processing of the vehicle data may reduce the size or volume of vehicle data for processing at a particular point in time. In the embodiments disclosed herein, processing of the vehicle data may be performed based on predetermined priority rather than simultaneous processing. In some embodiments, prioritized processing may be performed, based on multiple factors representing current operation status of vehicles, such as the nature of data, a purpose of data, identified objects in a scene, the location of a vehicle, programmed vehicle operations of autonomous vehicles, etc. The multiple factors may vary and be modifiable based on current operation status and various driving events.

In the embodiments disclosed herein, vehicle data such as sensor data and video data may be determined whether or not to indicate a predetermined operation status of a vehicle. In some embodiments, such determination is correlated with a determination of whether prioritized processing is needed or not. Depending on the current operation status of a vehicle, certain data may be subject to prioritized processing. For example, a vehicle traveling at a high rate of speed (e.g., while driving on a highway) may apply prioritized processing to data streams from vehicles sensors relating to the speed of a vehicle. As another example, if a vehicle is traveling along a city street and plans to turn right, data streams from vehicle sensors relating to the right turn such as a camera capturing moving objects in the vicinity of the right side of the vehicle, may be processed according to a system of prioritization.

Embodiments described herein relate to prioritizing data processing based on its immediate need with respect to the operation of a vehicle. In some embodiments, the order in which data from a variety of sensors is processed and/or transmitted is prioritized based on the use of the data. For example, with respect to a vehicle using image data for navigation, collision avoidance, or other related systems, image data related to foot traffic (e.g., related to an identified pedestrian) may be processed with priority while data or images or portions of images containing background buildings may be processed later because updating dynamic data like pedestrian traffic data may be prioritized over relatively static pictures such as buildings. The various systems and methods for prioritizing processing of vehicle data will be described in more detail herein with specific reference to the corresponding drawings.

FIG. 1 schematically depicts a connected cars system 10 including a vehicle 100 and a cloud computing system 20. The vehicle 100 includes a head unit 120, storage 140, and a group of sensors including various sensors 150. The head unit 120 controls operation of the vehicle 100 based on data points captured and sent from the sensors 150. The storage 140 is coupled to the head unit 120 and stores a set of data points under the control of the head unit 120. The sensors 150 include various types of sensors used in the vehicle 100. In some embodiments, the sensors 150 include one or more cameras, LIDAR sensor, radar sensors, ultrasonic sensors, an accelerometer, a proximity sensor, a braking sensor, a motion sensor, etc. The sensors 150 used in the vehicle 100 may not be limited thereto and other sensors can be implemented.

In some embodiments, the vehicle 100 also receives data points from a group of sensors 170 that may be arranged outside of the vehicle 100. For example, the sensors 170 may be arranged on or near buildings such as a parking structure, municipal infrastructure, the surroundings of the vehicle 100, etc. The vehicle 100 may receive data points from the sensors 170 via the network 200. In other embodiments, the vehicle 100 may receive the data points from surrounding vehicles 210 via a V2V communication channel. The sensors 170 may include various types of sensors such as one or more cameras, LIDAR sensors, an accelerometer, a proximity sensor, a braking sensor, a motion sensor, and the like.

As shown in FIG. 1, the vehicle 100 includes a communication unit 180 that exchanges data and information between the vehicle 100 and a network 200. As shown in FIG. 1, the vehicle 100 may be connected and communicate with one or more edge servers 220, 240 and 260. The edge servers 220, 240 and 260 may be connected and communicate with a central server 300. The central server 300 may be in communication with receivers 280, 285. The receivers 280, 285 also communicate with the vehicles 100 and 210.

Figure 2:
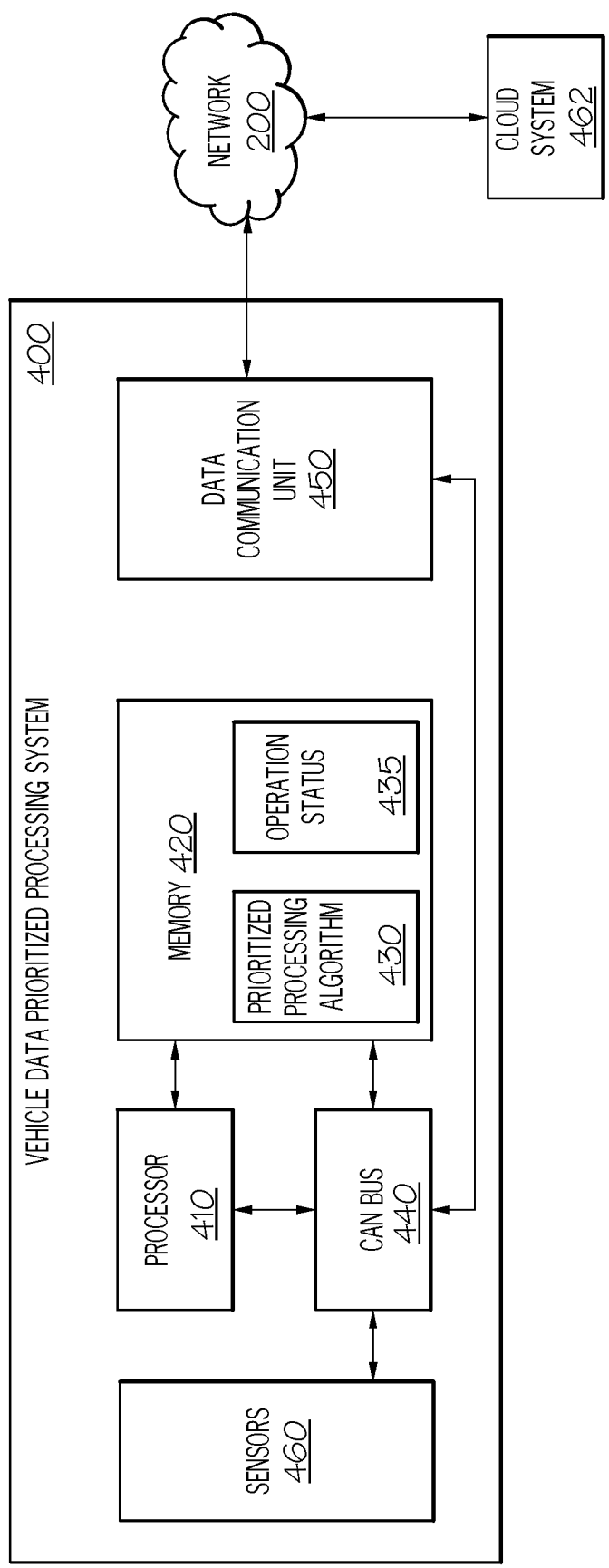
FIG. 2 schematically depicts a block diagram of a vehicle data prioritized processing system according to one or more embodiments shown and described herein.

Referring to FIG. 2, the structure and operation of a vehicle data prioritized processing system 400 according to one or more embodiments shown and described herein are explained in detail. The vehicle data prioritized processing system 400 includes a processor 410, a memory 420 and a group of sensors 460. A controller area network (CAN) bus 440 is connected to the processor 410, the memory 420 and the group of sensors 460 and operates as a communication interface. The sensors 460 provide various data points to the processor 410 which in turn processes such data points for various purposes. The processor 410 analyzes the data points from the sensors 460 to make various determinations. In some embodiments, the processor 410 analyzes the data to determine whether such data points are stored or discarded, and if stored, will be stored on board, or externally stored. In other embodiments, the processor 410 analyzes the data to determine a necessary action or reaction to the data points. For example, the processor 410 receives data points from sensors such as an accelerometer, analyzes the data points and finds that the vehicle 100 may be at risk of a crash situation. The processor 410 then may make a determination to cause an action to occur, such as stopping the vehicle 100, or outputting a warning requesting to slow the driving speed of the vehicle 100.

Alternatively, or additionally, the processor 410 analyzes the data points from the sensors 460 to determine operating conditions of the vehicle 100, speed, rotation, acceleration, deceleration, turning, movement of objects, etc. In other embodiments, the processor 410 may determine operation conditions, maintenance needs, etc. of various components of the vehicle 100, such as whether an engine of the vehicle 100 may have some maintenance issues.

In some embodiments, the vehicle data prioritized processing system 400 may be implemented in the head unit 120 as shown in FIG. 1. In other embodiments, the vehicle data prioritized processing system 400 may be implemented, independently of and separately from the head unit 120. In some embodiments, the vehicle data prioritized processing system 400 may be included in the vehicle 100.

In some embodiments, the memory 420 includes a prioritized processing algorithm 430 and predetermined operation status 435. The prioritized processing algorithm 430 is configured to prioritize data processing based on various factors. In some embodiments, the prioritized processing algorithm 430 is configured to prioritize data processing based on its immediate need with respect to the operation of the vehicle 100. In other embodiments, the prioritized processing algorithm 430 is configured to prioritize data processing based on use of the vehicle data, vehicle operation conditions, the location of the vehicle 100, a required response time, data processing requirements, or a combination thereof.

In some embodiments, the memory 420 includes a set of the predetermined operation status 435 which may be correlated with the priority accorded to each operation status. For example, for driving of an autonomous vehicle, processing and detection of dynamic features such as pedestrian movement may be prioritized over static features. As another example, when a vehicle stops at an intersection, tracking of vehicles, pedestrians, and objects may have priority. As another example, processing vehicle data relating to completing or supplementing a next sequence of movement of a vehicle may be prioritized. As another example, with respect to a vehicle using image data for navigation, collision avoidance, or other related systems, image data related to foot traffic (e.g., related to an identified pedestrian) may be processed with priority while data or images or portions of images containing background buildings may be processed later because its updating may not require immediate need as much as updating the foot traffic. In some embodiments, the set of the predetermined operation status 435 defines vehicle conditions, operations, driving event contexts, etc. that may trigger or dictate priority based processing.

In some embodiments, the prioritized processing algorithm 430 includes machine language based programs that process data points. Additionally, or alternatively, the memory 420 may store one or more machine learning algorithms or programs, for example, deep learning programs, neural network programs, pattern recognition programs, or the like. The machine learning algorithms may enable the system to learn driving patterns of the vehicle 100, predict situations that may result in a crash or collision of the vehicle 100, and the like. In other embodiments, the memory 420 further stores a program that recognizes and modifies user profiles such that vehicle settings can be changed accordingly. The memory 420 further stores various programs relating to analysis of data points of the sensors 150 and/or the sensors 170. The memory 420 also stores various application programs such as media players, a navigation program, programs used in the vehicle settings, etc.

Figure 3:
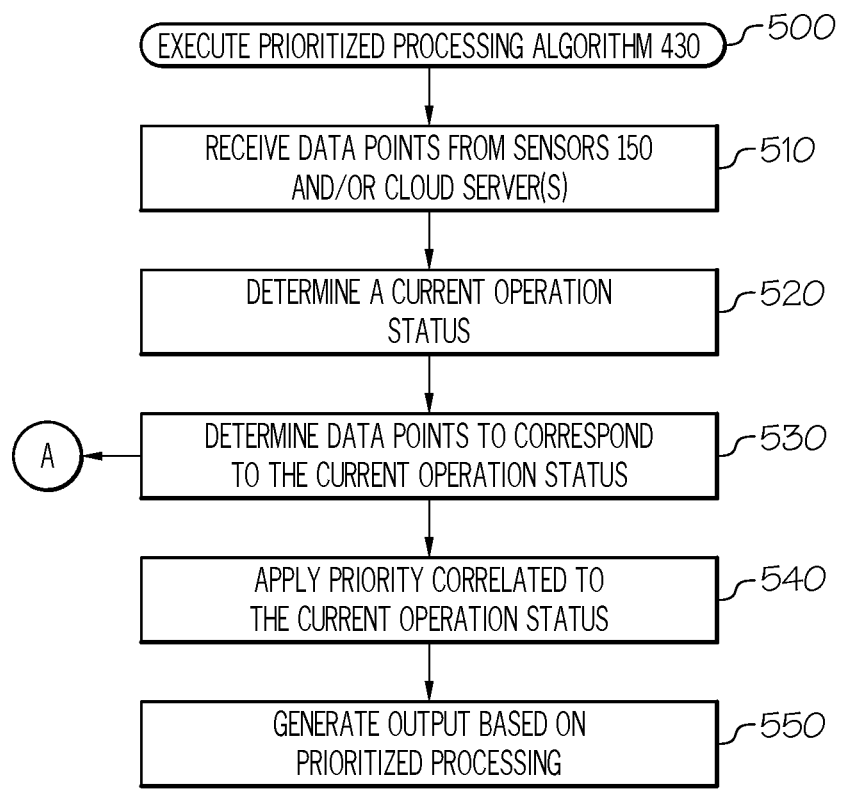
FIG. 3 depicts a flow chart of executing a prioritized processing algorithm used in the vehicle data prioritized processing system of FIG. 2.

Referring to FIG. 3, a flow chart of a process 500 for executing the prioritized processing algorithm 430 is explained in detail. The processor 410 receives data points from the sensors 460 (Step 510). As discussed above, the sensors 460 include various and different sets of sensors that generate data streams indicative of different operation conditions of the vehicle 100. Based on the received data points, the processor 410 determines a current operation status of the vehicle 100. (Step 520). In some embodiments, the current operation status of the vehicle 100 includes a driving speed, a driving location, a driving environment (e.g., road conditions, weather condition), vehicle maintenance conditions (e.g., component malfunction, component exchange, etc.), or a combination thereof. Additionally, or alternatively, the current operation status may include any indicator that may lead to a determination of prioritized processing of vehicle data. In addition, the current operation status may further indicate the importance and/or the use of vehicle data.

In some embodiments, the current operation status may indicate whether prioritized processing may be needed or not. For instance, the current operation status indicating a driving speed, a driving location, a driving environment, maintenance conditions, the importance of vehicle data, the use of vehicle data, or a combination thereof, may trigger, dictate, or invoke prioritized processing. The current operation status and prioritized processing will be discussed more in detail in connection with FIGS. 4A and 4B below. Referring back to FIG. 3, once the data points are determined to correspond to the current operation status (Step 530), priority processing correlated to the current operation status may be applied. (Step 540). Then the processor 410 generates an output based on the prioritized processing. (Step 550).

Figure 4A:
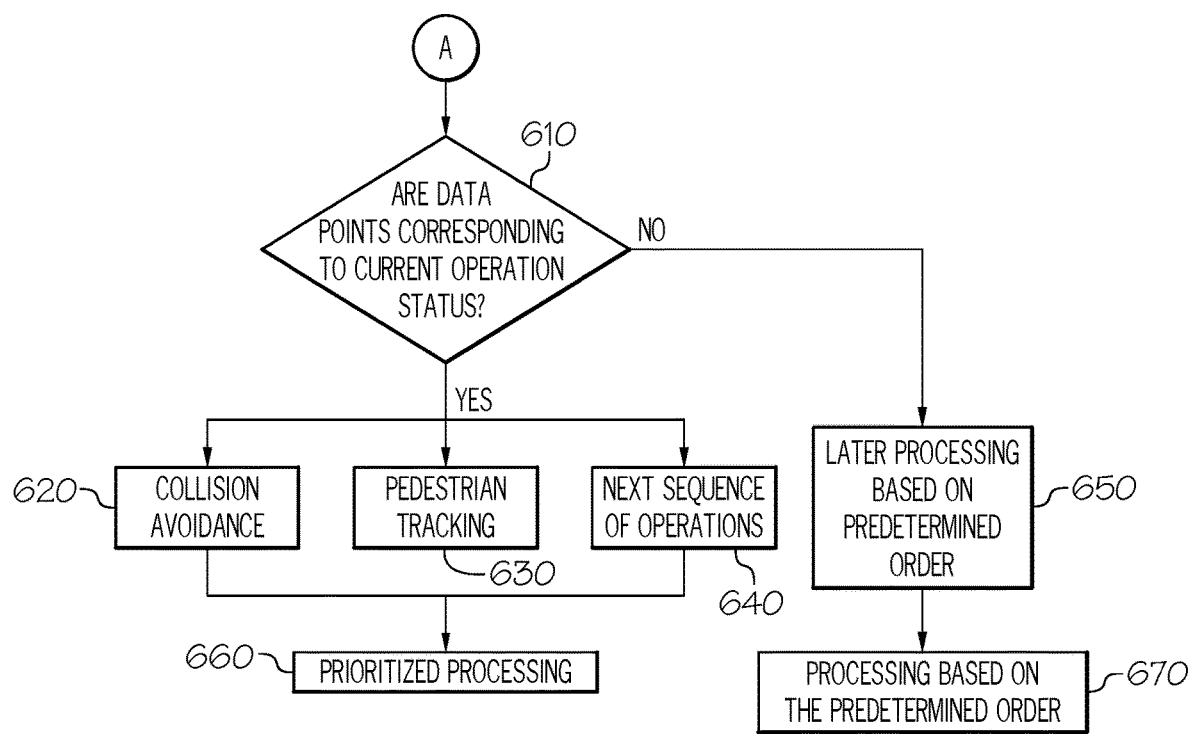
FIG. 4A depicts a flow chart of determining and performing prioritized processing according to one or more embodiments shown and described herein.

FIG. 4A depicts a flow chart illustrating further details of Step 530 with respect to determining whether the vehicle data points correspond to the current operation status (Step 610). The current operation status may trigger or dictate the processor 410 to perform prioritized processing. In some embodiments, the current operation status may indicate the situations where real time responses may be required, a next movement of the vehicle may be concerned, mitigation of damage and/or injury may be related, prevention of emergency may be related, etc. Additionally, or alternatively, the current operation status may indicate relatively more relevant and urgent context or situations in connection with current driving events. As shown in FIG. 4A, the vehicle data points correspond to the current operation status, for example, where the data points involve collision avoidance (Step 620), pedestrian tracking (Step 630), a next sequence of operations (Step 640), etc. These operation status are by way of example only and the vehicle data prioritized processing system 400 may not be limited thereto. In some embodiments, when the vehicle data points correspond to the current operation status indicative of collision avoidance (Step 620), prioritized processing takes place. (Step 660). If the current operation status indicates near-accident or accident situations, the processor 410 performs prioritized processing of the vehicle data points and therefore, may provide a faster and necessary response. The faster and necessary response may result in collision avoidance.

When the vehicle data points correspond to the current operation status indicative of pedestrian tracking (Step 630), prioritized processing takes place. (Step 660). For example, when a vehicle such as an autonomous vehicle is stopped at an intersection, the tracking of pedestrian tracking may need to be processed with priority. As another example, when a vehicle is driving in a crowded area, data associated with pedestrian tracking may need to be processed with priority.

While a vehicle is driving, tracking of moving objects such as pedestrians may be more important than detection of static objects such as buildings, tress, etc. As another example, the current operation status of the vehicle may include determining the traffic conditions around the vehicle, where the vehicle is located (e.g., highway, rural road, city street), the speed at which the vehicle is travelling, the frequency of stop-go, or a combination thereof, etc. By performing the prioritized processing, the processor 410 may quickly determine the situations where the vehicle is in and provide fast response to address the situations.

In other embodiments, in the context of an autonomous vehicle, processing resources may be prioritized toward needs in creating the three-dimensional (3D) landscape over other processing needs as autonomous vehicles rely on current landscapes. Additionally, or alternatively, within 3D landscapes, whether in an autonomous vehicle context or not, the processing and detection of dynamic features such as pedestrian movement may be prioritized over static ones, such as updating locations of buildings, trees, etc.

As shown in FIG. 4A, if the data points are not corresponding to the current operation status, then the processor 410 may process such data points based on a predetermined order for regular processing. (Step 650). In some embodiments, the predetermined order may be based on multiple factors such as a timing of receipt of data points at the processor 410, processing time required for processing those data points, present processing load at the processor 410, whether there is an external request for data points from a cloud or any other components of the vehicle, or a combination thereof. Based on the predetermined order, the processing takes place. (Step 670).

Figure 4B:
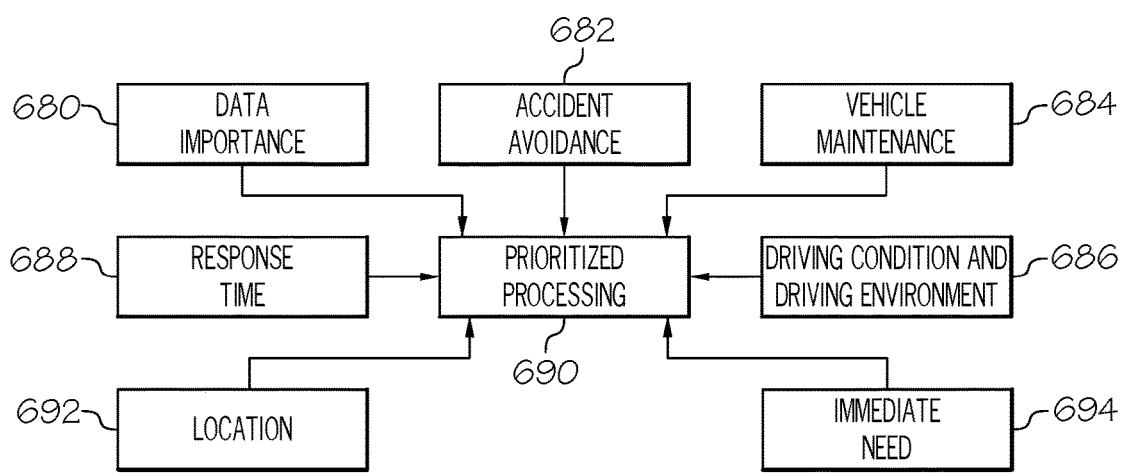
FIG. 4B depicts various factors that trigger or dictate prioritized processing according to one or more embodiments shown and described herein.

FIG. 4B depicts various situations that may trigger or dictate prioritized processing 690. In some embodiments, various situations include the current operation status, current actions, driving events, driving conditions, driving environment, the nature and purpose of vehicle data, processing and/or response time, computing resources, etc. As shown in FIG. 4B, one example of various situations includes data importance 680. In some embodiments, the order of processing or transmission of information may be prioritized based on its importance and/or its use. For example, information related to a pedestrian may be transmitted to vehicles immediately based on a geographic location of the vehicle while information related to weather conditions may be transmitted later to a central server.

Another factor may include accident avoidance 682. For example, with respect to a vehicle using image data for navigation, collision avoidance or other related systems, image data related to foot traffic (e.g., related to an identified pedestrian) may be processed first while data or images or portions of images containing background buildings may be processed later because updating such data may not be prioritized as compared to foot traffic.

Vehicle maintenance 684 may be prioritized in relevant situations. For example, engine status data regarding oil health, oil levels, or the like may be deprioritized in view of image data for navigating a roadway while the vehicle is in motion. When the vehicle stops, data associated with the engine and/or maintenance status of the vehicle may be prioritized and processed if computing resources are available.

Another example of various situations includes a response time 688. In some embodiments, determining priority of processing data may be determined based on an estimation of how long it will take to process the data to achieve a result and/or the response time to sending the information off-board (i.e., transmitting to another vehicle or server) for processing and receiving a result. In some instances, especially when large amounts of data need to be processed or complex images are obtained, it may be desirable that the data be distributed to other local computing devices to achieve the needed priority of results. The prioritization may include the order in which data is transmitted between a local distribution network, a regional distribution network, and a central distribution network.

Further another example of various situations includes a driving location 692 of the vehicle. For example, when the vehicle is driving on a highway, or in the city street, prioritized processing may vary. By way of example, while the vehicle is driving on a highway, processing image data for navigating highway may be prioritized over processing of data points that can be processed while the vehicle is not in motion, or in slow speed driving. As another example, while the vehicle is driving at the intersection of the city street, processing of data points relating to moving pedestrians, an adjacent vehicle, etc. may be prioritized over detecting static objects such as nearby buildings.

As another example, sensor data related to driving conditions and/or a driving environment 686 may be processed according to priority. For instance, determining road conditions (e.g., identifying road anomalies such as potholes) may be prioritized for processing.

Another factor may include immediate need of data points 694. In some embodiments, the immediate needs may be defined based on current actions of the vehicle. For example, engine status data regarding oil health, oil levels, or the like may be deprioritized in view of image data for navigating a roadway while the vehicle is in motion, as the image data may have the immediate need for the motion of the vehicle.

Although FIG. 4B depicts several factors that may trigger the prioritized processing 690, these factors may have overlap to some extent. For instance, the data importance 680 may also be associated with the immediate need 694. In other embodiments, the location 692 may have impact on the data importance 680 and the immediate need 694. The driving conditions and the driving environment 686 may have impact on the vehicle maintenance 684 and the accident avoidance 682.

In some embodiments, the processing and/or transmission of data points from the sensors 460 of the vehicle may be prioritized based on the vehicle's present situation, the need for results from the data points, and/or the processing resources available. For example, if engine status data regarding oil health, oil levels, or the like has been deprioritized in view of image data for navigating a roadway while the vehicle was in motion, then reprioritization and processing of the engine status may occur when the vehicle stops. As another example, determining road conditions may be prioritized over conducting vehicle health assessments and determining whether maintenance is required.

In some embodiments, priority among different and various sensor data sets may be modified and updated as the operation condition of the vehicle changes. In other words, reprioritization of deprioritized or prioritized data points may take place as the changed operation condition of the vehicle may impact the standing priority. In some embodiments, the priority among the different data points may be relative priority.

In some embodiments, the vehicle data prioritized processing system 400 may be collecting data from the multiple sensors 460 and various components within the vehicle. The memory 420 may include a status manager program, for example, that indicates the current actions of the vehicle such as cruising on a highway, navigating a city street, stopped at a stop light, parked in a parking lot, or the like. The memory 420 further stores sensor data that is currently being collected by the sensors 460 and sensor data that may be prioritized with a lower priority in the past and currently queued. For example, engine status data regarding oil health, oil levels, or the like has been deprioritized and queued in view of the current action of the vehicle being in motion. While the current action is the vehicle being in motion, image data that are being currently collected are subject to prioritized processing to navigate a roadway. When the vehicle is stationary, the engine status data may be changed from the deprioritized state and processed if computing resources are available.

Figure 5:
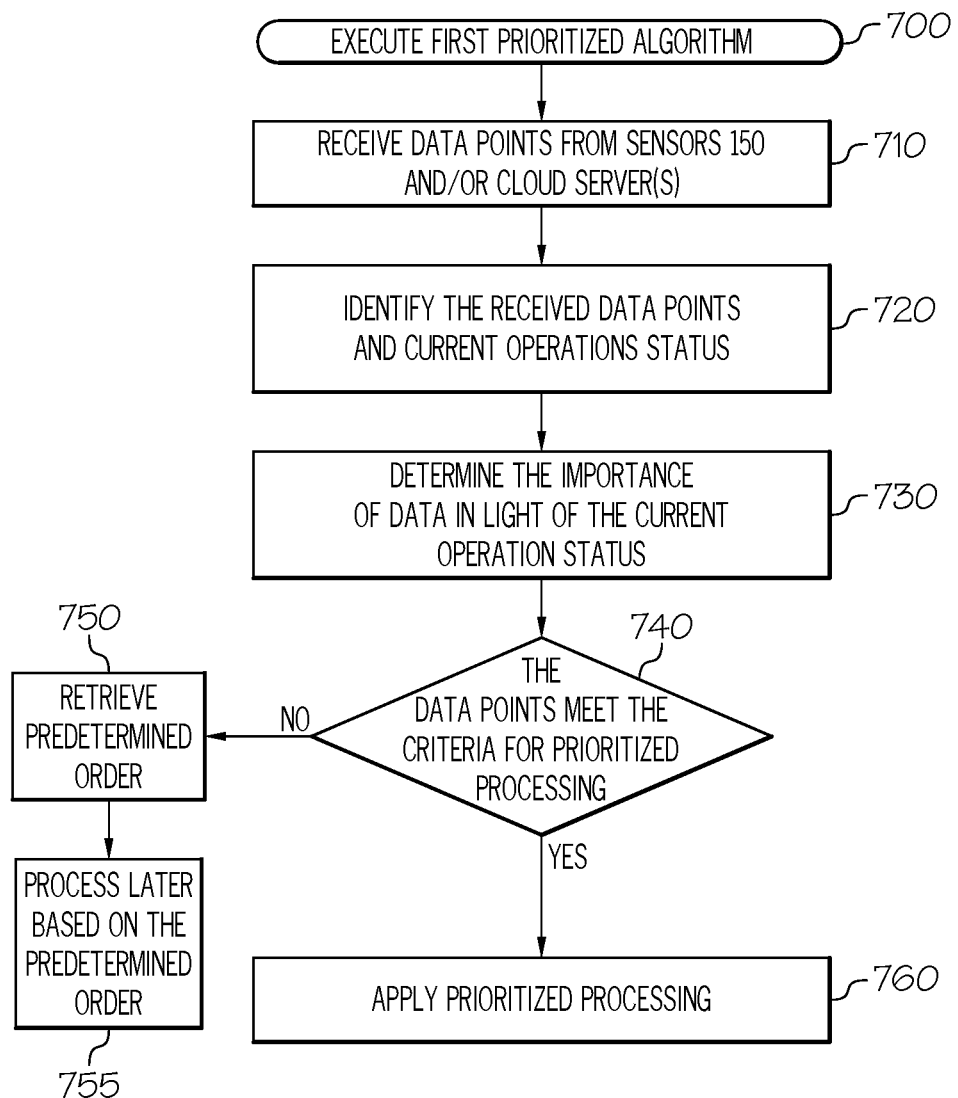
FIG. 5 depicts a flow chart of executing a first prioritized algorithm according to one or more embodiments shown and described herein.

FIG. 5 depicts a flow chart of executing a first prioritized algorithm 700 according to one or more embodiments shown and described herein. The processor 410 receives data points from the multiple sensors 460 and/or cloud servers. (Step 710). Based on the data points, the processor 410 may identify a current operation status based on the received data points (Step 720). The processor 410 then determines the importance of data points in light of the current operation status (Step 730). The next step is whether the data points meet the criteria for prioritized processing (Step 740). If the criteria for prioritized processing are met with the data points, such data points are subject to prioritized processing (Step 760). If the criteria may not be met, then a predetermined order of processing of the data points may be retrieved (Step 750). The data points may be processed later based on the retrieved predetermined order (Step 755).

Figure 6:
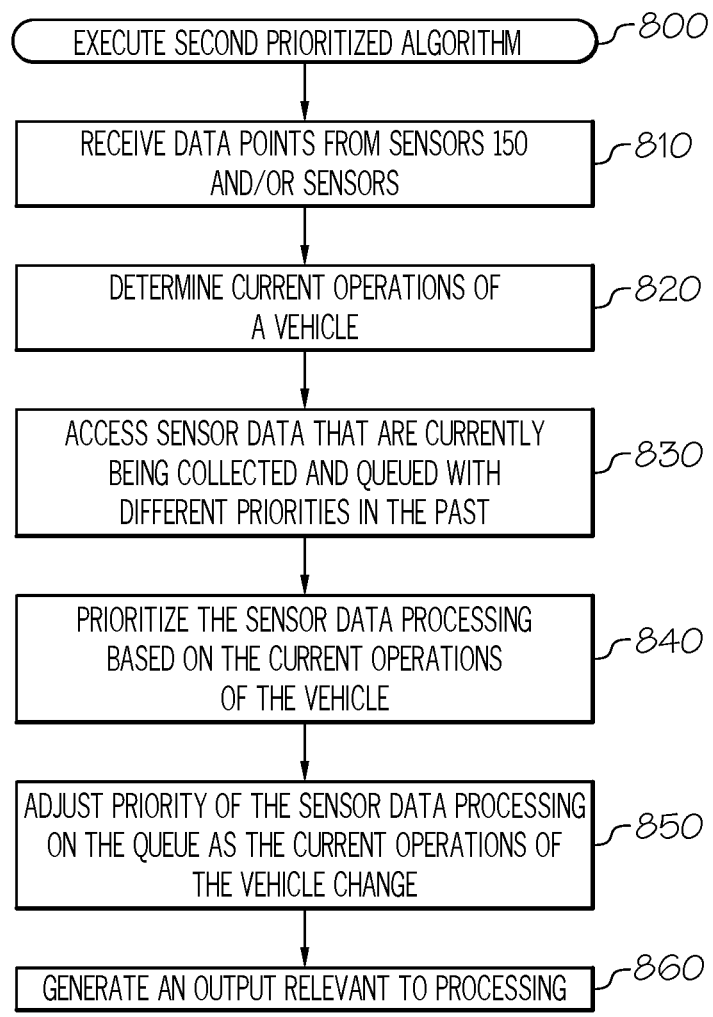
FIG. 6 depicts a flow chart of executing a second prioritized algorithm according to one or more embodiments shown and described herein.

FIG. 6 depicts a flow chart of executing a second prioritized algorithm 800 according to one or more embodiments shown and described herein. The processor 410 receives data points from the multiple sensors 460 and/or cloud servers. (Step 810). Based on the data points, the processor 410 may identify a current operation status based on the received data points (Step 820). The processor 410 then accesses sensor data that are currently being collected and queued with different priorities in the past (Step 830). The processor 410 prioritizes the sensor data processing based on the current operations of the vehicle (Step 840). The current operations of the vehicle may change. In some embodiments, the current operations of the vehicle may be in motion and then changed to stop. In other embodiments, the current operations of the vehicle may also change from driving on a highway to driving on a city street. As the current operations of the vehicle may change, priority of the sensor data on the queue may be adjusted (Step 850). The processor 410 generates an output relevant to processing (Step 860).

Figure 7:
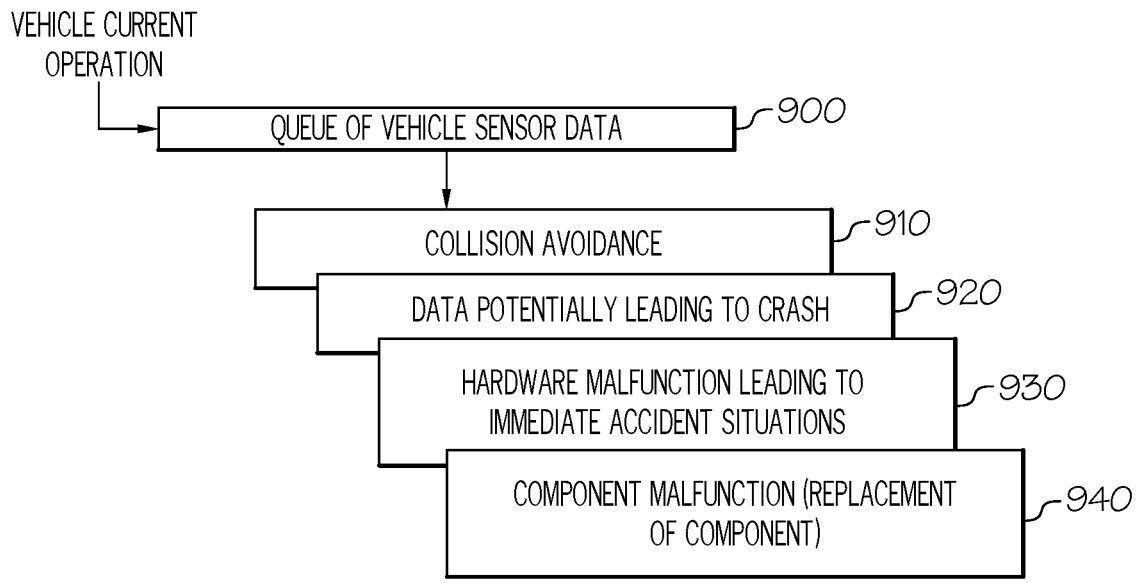
FIG. 7 depicts exemplary hierarchical priority layers of sensor data sets.

FIG. 7 depicts one example of hierarchical priority layers of the sensor data from the multiple sensors 460 that are stored in a data queue 900. The sensor data stored in the data queue 900 may have different levels of priority. In some embodiments, collision avoidance has a higher priority level 910, and data potentially leading to crash 920 may take a next priority level. Hardware malfunction leading to immediate accident situations 930 may be a next lower priority level. Component malfunction 940 which can be replaced with a new component may take the lowest priority level. The hierarchical relationship shown in FIG. 7 is by way of example and the prioritized processing systems and methods described here are not limited thereto.

In other embodiments, the higher priority level may include tracking of vehicles, pedestrians, and moving objects when a vehicle is stopped at an intersection. In that case, detection of objects and defining a local environment may be a lower priority than detecting pedestrian tracking, for example. As another example, the higher priority level may include the situation where if a route is known or a next move is anticipated, such as a turn, priority in processing sensor data that relates to completing or supplementing the "next move" may be prioritized over processing other sensor data, such as weather processing, inter vehicle communications and requests. As further another example, in the context of an autonomous vehicle, processing resources may be prioritized toward needs in creating the 3D landscape over other processing needs as autonomous vehicles rely on current landscapes. Additionally, or alternatively, within 3D landscapes, whether in an autonomous vehicle context or not, the processing and detection of dynamic features such as pedestrian movement may be prioritized over static ones, such as updating locations of buildings, trees, etc.

In one embodiment, a vehicle data processing system includes a group of sensors, a controller, and a communication interface. The group of sensors is arranged on board and operable to detect and capture driving event. The controller is coupled to the group of sensors and operable to receive one or more data streams indicative of the driving event data from the group of sensor. The communication interface is coupled to the group of sensors and the controller for data transmission. The controller is further operable to (i) analyze the one or more data streams, (ii) determine a current operation status of a vehicle based on the one or more data streams, (iii) determine whether or not the current operation status of the vehicle triggers prioritized processing of the one or more data streams, and (iv) upon determination that the prioritized processing is triggered, apply the prioritized processing.

In another embodiment, the current operation status indicates crash avoidance, moving object tracking, or both. In another embodiment, the current operation status indicates a speed of a vehicle, a location of a vehicle, a driving environment, or a combination thereof. In yet another embodiment, the current operation status indicates a next sequence of operation of an autonomous vehicle.

In yet another embodiment, the controller is further operable to (i) determine a first driving event of the vehicle based on a first set of the one or more data streams, (ii) determine a second driving event of the vehicle based on a second set of the one or more data streams, and (iii) determine priority between the first driving event and the second driving event based on the current operation status of the vehicle.

In yet another embodiment, the controller is further operable to adjust the priority between the first driving event and the second driving event as the current operation status of the vehicle changes.

In yet another embodiment, the controller is further operable to process the one or more data streams of a deprioritized driving event when computing resources are available.

In another embodiment, a vehicle data processing system comprises multiple sensors, a processor and a memory. The multiple sensors collect one or more data points relating to a driving event of a vehicle. The processor is coupled to the multiple sensors and operable to receive the one or more data points. The processor is further operable to determine a current action of the vehicle based on the one or more data points. The memory is coupled to the processor and stores a status manager program and a sensor data queue for storing a set of sensor data prior to a present reference point. Upon execution by the processor, the status manager program causes the processor to prioritize and process present sensor data that is being collected by the multiple sensors at the present reference point and the set of sensor data that are queued in the sensor data queue based on the current action of the vehicle.

In another embodiment, the processor is further operable to reprioritize the present sensor data and the set of sensor data as the current action of the vehicle changes. In yet another embodiment, the processor is further operable to process the set of sensor data as being queued with a lower priority when the current action of the vehicle changes to a stationary action. In yet another embodiment, the processor is further operable to process the set of sensor data as being queued with a lower priority when computing resources are available. In yet another embodiment, the processor is further operable to prioritize processing of the one or more data points required by the current action of the vehicle.

In yet another embodiment, the processor is further operable to deprioritize one or more of the present sensor data and the set of sensor data stored in the sensor data queue based on the current action of the vehicle.

In another embodiment, a vehicle data processing method comprises the steps of (i) collecting with multiple sensors one or more data points relating to a driving event of a vehicle, (ii) storing a set of sensor data that has been collected prior to a present reference point in a sensor data queue, (iii) receiving at a processor one or more data points from the multiple sensors, (iv) determining a current action of the vehicle based on the one or more data points, and (v) prioritizing and processing, with the processor, present sensor data that is being collected by the multiple sensors at the present reference point and the set of sensor data that are queued in the sensor data queue based on the current action of the vehicle.

In another embodiment, the vehicle data processing method further comprises the steps of reprioritizing the present sensor data and the set of sensor data as the current action of the vehicle changes. The vehicle data processing method further comprises processing the set of sensor data as being queued with a lower priority when the current action of the vehicle changes to a stationary action. The vehicle data processing method further comprises processing the set of sensor data as being queued with a lower priority when computing resources are available.

In yet another embodiment, the vehicle data processing method further comprises prioritizing processing of the one or more data points required by the current action of the vehicle. The vehicle data processing method further comprises deprioritizing one or more of the present sensor data and the set of sensor data stored in the sensor data queue based on the current action of the vehicle.

In yet another embodiment, the vehicle data processing method further comprises steps of (i) determining a first driving event of the vehicle based on a first set of the one or more data points, (ii) determining a second driving event of the vehicle based on a second set of the one or more data points, and (iii) determining priority between the first driving event and the second driving event based on the current operation status of the vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle data processing system, comprising:
a group of sensors arranged on board a vehicle and operable to detect and capture driving event data; and
a controller coupled to the group of sensors and operable to receive one or more data streams indicative of the driving event data from the group of sensors;
wherein the controller is further operable to:
analyze the one or more data streams;
determine a current operation status of a vehicle based on the one or more data streams;
determine whether or not the current operation status of the vehicle triggers prioritized processing of the one or more data streams; and
upon determination that the prioritized processing is triggered, apply the prioritized processing, wherein applying the prioritized processing comprises processing a first data stream corresponding to a first driving event at a present reference point prior to a second data stream corresponding to a second driving event at the present reference point, and wherein the prioritized processing is based on respective times for processing of the first data stream and the second data stream to achieve respective results.

2. The vehicle data processing system of claim 1, wherein the current operation status indicates crash avoidance, moving object tracking, or both.

3. The vehicle data processing system of claim 1, wherein the current operation status indicates a speed of a vehicle, a location of a vehicle, a driving environment, or a combination thereof.

4. The vehicle data processing system of claim 1, wherein the current operation status indicates a next sequence of operation of an autonomous vehicle.

5. The vehicle data processing system of claim 1, wherein the controller is further operable to:
determine priority between the first driving event and the second driving event based on the current operation status of the vehicle.

6. The vehicle data processing system of claim 5, wherein the controller is further operable to:
adjust the priority between the first driving event and the second driving event as the current operation status of the vehicle changes.

7. The vehicle data processing system of claim 6, wherein the controller is further operable to:
process the one or more data streams of a deprioritized driving event when computing resources are available.

8. The vehicle data processing system of claim 1, wherein the prioritized processing is further based on respective response times between sending the first data stream and the second data stream off-board and receiving the respective results in response to sending the first data stream and the second data stream off-board.

9. A vehicle data processing system, comprising:
multiple sensors that collect one or more data points relating to a driving event of a vehicle;
a processor coupled to the multiple sensors and operable to receive the one or more data points, the processor further operable to determine a current action of the vehicle based on the one or more data points; and
a memory coupled to the processor and storing a status manager program and a sensor data queue for storing a set of sensor data prior to a present reference point, wherein upon execution by the processor, the status manager program causes the processor to prioritize and process present sensor data that is being collected by the multiple sensors at the present reference point and the set of sensor data that are queued in the sensor data queue based on the current action of the vehicle, wherein the prioritizing and processing includes prioritizing and processing the present sensor data that is being collected by the multiple sensors at the present reference point prior to the set of sensor data that are queued in the sensor data queue based on the current action of the vehicle, and wherein the prioritizing and processing is based on respective times for processing of the first data stream and the second data stream to achieve respective results.

10. The vehicle data processing system of claim 9, wherein the processor is further operable to reprioritize the present sensor data and the set of sensor data as the current action of the vehicle changes.

11. The vehicle data processing system of claim 10, wherein the processor is further operable to process the set of sensor data as being queued with a lower priority when the current action of the vehicle changes to a stationary action.

12. The vehicle data processing system of claim 10, wherein the processor is further operable to process the set of sensor data as being queued with a lower priority when computing resources are available.

13. The vehicle data processing system of claim 9, wherein the processor is further operable to prioritize processing of the one or more data points required by the current action of the vehicle.

14. The vehicle data processing system of claim 9, wherein the processor is further operable to deprioritize one or more of the present sensor data and the set of sensor data stored in the sensor data queue based on the current action of the vehicle.

15. The vehicle data processing system of claim 9, wherein the prioritizing and processing is further based on respective response times between sending the first data stream and the second data stream off-board and receiving the respective results in response to sending the first data stream and the second data stream off-board.

16. A vehicle data processing method, comprising:
    collecting with multiple sensors one or more data points relating to a driving event of a vehicle;
    storing a set of sensor data that has been collected prior to a present reference point in a sensor data queue;
    receiving at a processor one or more data points from the multiple sensors;
    determining a current action of the vehicle based on the one or more data points; and
    prioritizing and processing, with the processor, present sensor data that is being collected by the multiple sensors at the present reference point and the set of sensor data that are queued in the sensor data queue based on the current action of the vehicle, wherein the prioritizing and processing includes prioritizing and processing the present sensor data that is being collected by the multiple sensors at the present reference point prior to the set of sensor data that are queued in the sensor data queue based on the current action of the vehicle, and wherein the prioritizing and processing is based on respective times for processing of the first data stream and the second data stream to achieve respective results.

17. The vehicle data processing method of claim 16, further comprising:
    reprioritizing the present sensor data and the set of sensor data as the current action of the vehicle changes; and
    additional prioritizing and processing of the present sensor data and the set of sensor data, wherein the additional prioritizing and processing is based on an amount of time for processing the present sensor data as compared to a different amount of time for processing the set of sensor data that are queued in the sensor data queue.

18. The vehicle data processing method of claim 16, further comprising:
    processing the set of sensor data as being queued with a lower priority when the current action of the vehicle changes to a stationary action.

19. The vehicle data processing method of claim 17, further comprising:
    processing the set of sensor data as being queued with a lower priority when computing resources are available.

20. The vehicle data processing method of claim 16, further comprising:
    prioritizing processing of the one or more data points required by the current action of the vehicle.

21. The vehicle data processing method of claim 16, further comprising:
    deprioritizing one or more of the present sensor data and the set of sensor data stored in the sensor data queue based on the current action of the vehicle.

22. The vehicle data processing method of claim 16, further comprising:
    determining a first driving event of the vehicle based on a first set of the one or more data points;
    determining a second driving event of the vehicle based on a second set of the one or more data points; and
    determining priority between , the first driving event and the second driving event based on the current operation status of the vehicle.

23. The vehicle data processing method of claim 16, wherein the prioritizing and processing is further based on respective response times between sending the first data stream and the second data stream off-board and receiving the respective results in response to sending the first data stream and the second data stream off-board.

* * * * *